United States Patent [19]

Strand

[11] Patent Number: 4,478,544
[45] Date of Patent: Oct. 23, 1984

[54] COMPOSITE RIVET

[75] Inventor: Norman S. Strand, Howell, Mich.

[73] Assignee: Microdot Inc., Darien, Conn.

[21] Appl. No.: 384,873

[22] Filed: Jun. 4, 1982

[51] Int. Cl.³ .............................................. F16B 13/04
[52] U.S. Cl. ...................................... 411/34; 411/501;
411/901; 411/908; 411/909; 428/285
[58] Field of Search ....................... 411/21, 22, 23, 34,
411/35, 36, 37, 38, 501, 900, 901, 904, 907, 908,
909; 428/285

[56] References Cited

U.S. PATENT DOCUMENTS

| 371,884 | 10/1887 | Gaylord | 411/501 X |
| 2,257,538 | 9/1941 | Schlueter | 411/34 |
| 2,510,693 | 6/1950 | Green | 411/501 |
| 2,994,933 | 8/1961 | Wolfe | 411/909 X |
| 3,296,048 | 1/1967 | Wolfe | 411/908 X |
| 3,354,260 | 11/1967 | Brandt et al. | 411/909 X |
| 3,492,909 | 2/1970 | Triplett | 411/34 |
| 3,544,143 | 12/1970 | Ohlsson | 411/501 X |
| 3,568,311 | 3/1971 | Lawton | 411/908 |
| 3,778,334 | 12/1973 | Sturgeon | 428/285 |
| 4,306,824 | 12/1981 | Tanaka et al. | 411/34 |

FOREIGN PATENT DOCUMENTS

| 519317 | 5/1953 | Belgium | 411/34 |
| 612074 | 11/1948 | United Kingdom | 411/34 |
| 812993 | 3/1981 | U.S.S.R. | 411/908 |

Primary Examiner—Thomas J. Holko
Attorney, Agent, or Firm—Lyman R. Lyon

[57] ABSTRACT

The disclosure relates to a reinforced plastic rivet comprising a plurality of substantially continuous carbon fibres encapsulated in a partially polymerized thermoset resin matrix and enveloped in a high tensile strength low modulus tubular sheath. A portion of the rivet is deformable to form a head and fully polymerizable upon heating thereof.

2 Claims, 9 Drawing Figures

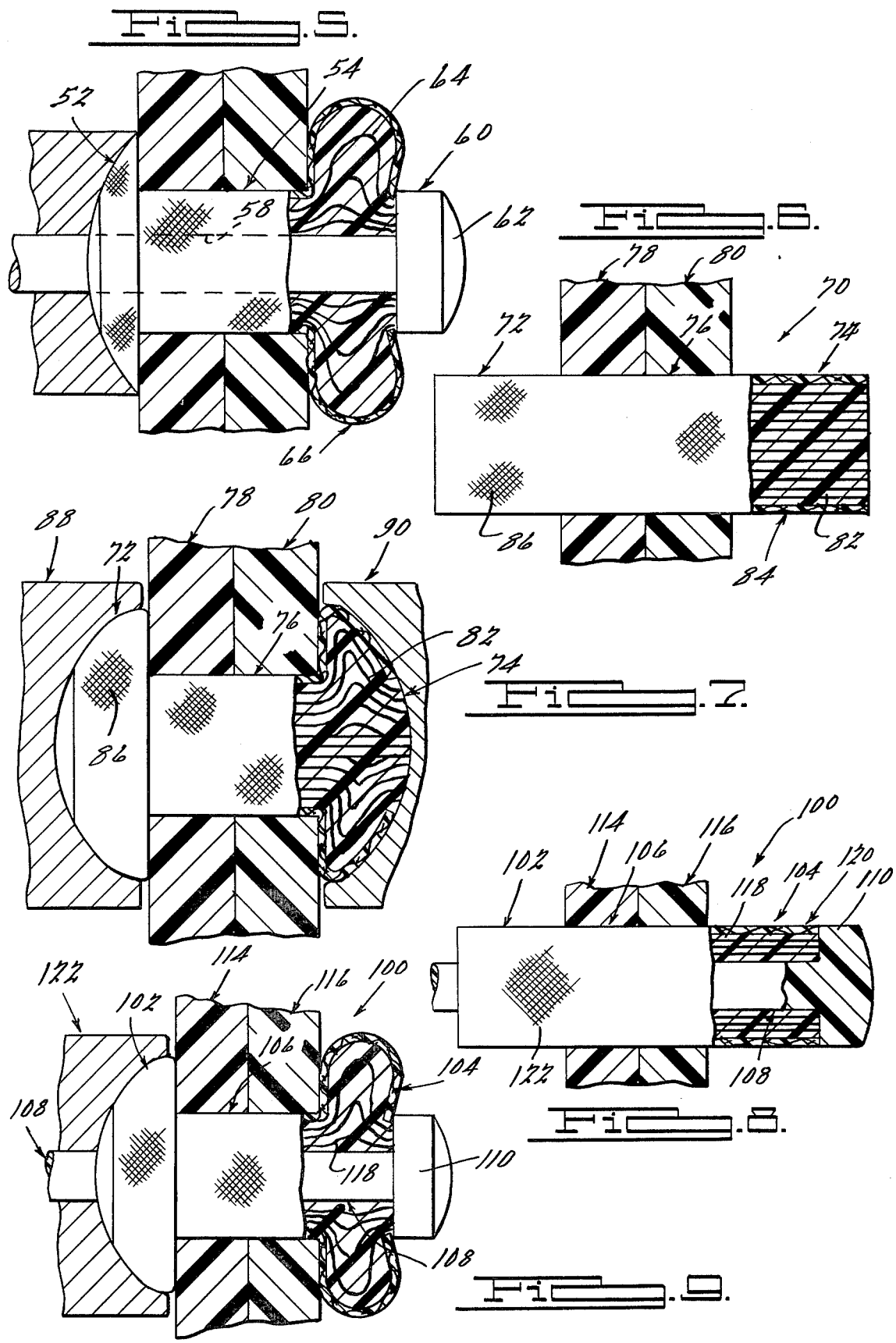

COMPOSITE RIVET

BACKGROUND OF THE INVENTION

The outstanding strength to weight characteristic of composite materials, for example, carbon fibre reinforced resins, has led the aircraft industry to the use of such materials in airframe structural components. However, use of carbon fibre reinforced resins has been limited by the difficulty of mechanically fastening such materials to one another or to structural components of the airframe employing other materials. Conventional mechanical fasteners are unsatisfactory for several reasons. One characteristic of composite materials is that the material adjacent the periphery of an aperture therein is subject to shattering or cracking when relatively high unit pressure is brought to bear thereagainst. Conventional metal rivets often exhibit metal flow incident to the head upsetting operation that induces high unit pressure on the periphery of the rivet hole. Fracture of the composite structure under or adjacent the rivet head may not be evident or even immediate. However, subjection of an airframe to the vibratory environment encountered during normal flight conditions or severe loading as is experienced in inclement weather conditions may result in failure of the composite structure.

Metal screws are generally unacceptable for fastening composite materials since unit stress in the thread form is relatively high.

Conventional metal bolts with nuts thereon are subject to a weight penalty.

To solve the aforesaid problem, the aircraft industry is currently utilizing adhesives to join composite components. However, adhesively bonded joints generally fail prior to failure of the structural components, which is contrary to fundamental design criteria in the aircraft industry.

While attempts to solve the aforesaid problem have been made using plastic rivets, such rivets heretofore known and used do not exhibit sufficient shear strength to be suitable for aircraft applications.

For example, Lyon application Ser. No. 342,176 entitled Blind Rivet, and assigned to the assignee of the instant invention, teaches forming a plastic rivet by the application of heat to first soften and thereafter fully polymerize a "B" stage thermoset resin. The rivet comprises a hollow, headed body of "B" stage thermoset resin that is supported by a headed mandrel. After heating of the rivet body the mandrel is pulled relative to a workpiece thereby forming a head on the blind side of the workpiece. The "B" stage thermoset resin thereafter fully polymerizes to the thermoset condition. Such rivets exhibit shear strength in the range of 15,000 p.s.i.

It is evident, however, that fastening of composite components that exhibit a shear strength of 50,000 p.s.i. with relatively low strength plastic rivets does not produce an assembly suitable for aircraft structural applications. Thus, a need exists for a rivet that exhibits physical characteristics similar to modern composite materials.

SUMMARY OF THE INVENTION

The rivet of the present invention utilizes carbon fibres encapsulated in an incompletely polymerized or "B" stage thermoset resin matrix. The carbon fibres may be in the form of braided or parallel bundles or "tows". The thermoset resin matrix and carbon fibres are encased in a sheath of high tensile strength low modulus material, which also is encapsulated in a "B" stage thermoset resin matrix. The sheath controls deflection and projection of the carbon fibres upon formation of a rivet head. In all disclosed embodiments of the invention, compression of the "B" stage thermoset resin matrix and surrounding sheath, which are softened due to the application of heat, forms a radially extending rivet head that is integral with the shear portion of the rivet and which, when fully polymerized, forms a riveted connection that exhibits relatively high shear strength.

BRIEF DESCRIPTION OF THE DRAWINGS

FIG. 5 is a view of the rivet of FIG. 3 after tensioning of the mandrel thereof to form a blind head on the rivet.

FIG. 6 is a view similar to FIG. 1 of another embodiment of the instant invention utilizing parallel carbon fibres.

FIG. 7 is a view of the rivet of FIG. 6 after formation of heads at opposite ends thereof.

FIG. 8 is a view of yet another embodiment of the instant invention.

FIG. 9 is a view of the rivet of FIG. 8 after tensioning of the mandrel thereof.

DETAILED DESCRIPTION OF THE PREFERRED EMBODIMENT OF THE INVENTION

Figure 1:
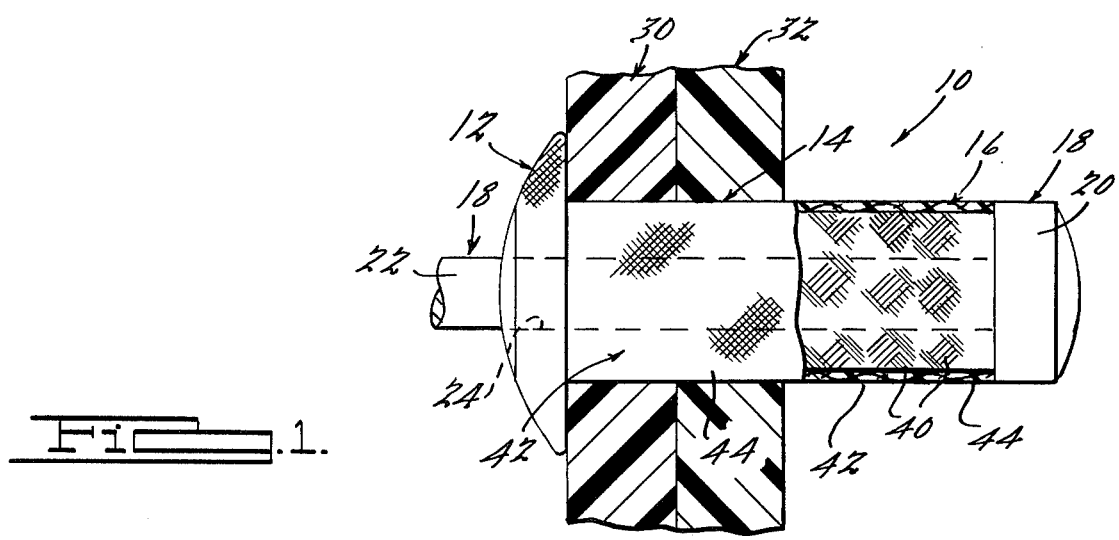
FIG. 1 is an elevational view, partially in cross section, of one embodiment of the composite rivet of the instant invention in association with workpieces to be joined thereby.

As best seen in FIG. 1 of the drawings, a rivet 10 in accordance with a constructed embodiement of the instant invention comprises a preformed head portion 12, a shear portion 14, a blind head forming portion 16, and a mandrel 18. The mandrel 18 has an anvil 20 at one end thereof and a tensioning stem 22 at the other end thereof. The mandrel 18 is journaled in a complementary aperture 24 that extends through the head, shear and head forming portions 12, 14 and 16, respectively, of the rivet 10. The shear portion 14 of the rivet 10 is coextensive with the cumulative thickness of a pair of workpieces 30 and 32.

Figure 2:
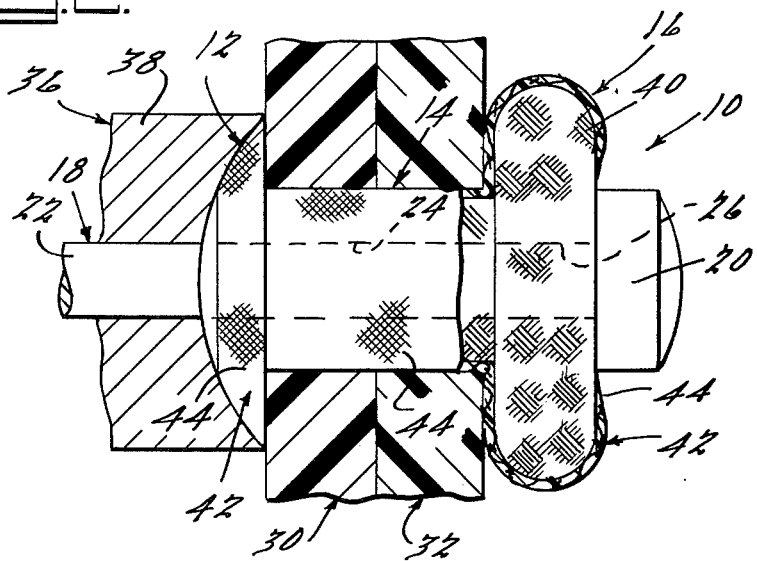
FIG. 2 is a view of the rivet of FIG. 1 after tensioning of the rivet mandrel to form a blind head on the rivet.

The mandrel 18 is adapted to be pulled to the left, as seen in FIG. 2 of the drawings, by a tool 36 of conventional design having a head portion 38 which engages the head 12 of the rivet 10 to bias the rivet 10 against the workpiece 30 when the mandrel 18 is pulled. Tension on the mandrel 18 to the left, as seen in the drawings, results in deformation of head forming portion 16 into the mushroom configuration shown.

In accordance with one feature of the instant invention, the head, shear and head forming portions 12, 14 and 16, respectively, of the rivet 10, comprise braided bundles or "tows" of carbon fibres 40 that are impregnated or encapsulated in a partially polymerized or "B" stage thermoset resin matrix.

In a constructed embodiment of the invention, the rivet 10 has a diameter of 0.1875 inch and contains 12 tows of carbon fibre each of which contains approximately 12,000 fibres. The carbon fibres are graphite based and are surface treated to improve interlaminary shear properties. The fibres exhibit an ultimate elongation of 1.3%, and a density of 0.0640 lbs/in$^3$. Filament diameter of the carbon fibres is 7 to 9 microns, resulting in a tow area of $0.075 \times 10^{-2}$ inches$^2$. Typical properties of an epoxy resin composite using the aforesaid fibres and matrix are flexural strength of $270 \times 10^3$ lbs/in$^2$, flexural modulus of $19 \times 10^6$ lbs/in$^2$, tensile strength of $275 \times 10^3$ lbs/in$^2$ and a tensile modulus of $20.5 \times 10^6$ lbs/in$^2$ where fibre volume equals 62%. Suitable fibres are graphite fibres designated AS4 and sold under the trademark MAGNAMITE by Hecules Incorporated.

The matrix employed in the constructed embodiment of the instant invention comprises a thermoset resin that is blended with an aromatic amine curing agent and partially polymerized. Representative materials and proportions are 157.5 parts of Shell 828 expoxy resin obtainable from the Shell Chemical Company and 42.5 parts of methylene dianiline curing agent obtainable from BASF Wyandotte Corporation.

In accordance with another feature of the instant invention, the resin impregnated carbon fibre tows 40 are enveloped in an outer sheath 42 of high tensile strength, low modulus material. In the constructed embodiment illustrated in FIG. 1, the sheath 42 comprises braided tows 44 of aromatic polyamid fibre. The aromatic polyamid fibres utilized exhibit a Density of 0.050 lbs/in$^3$, a Tensile Strength of $200 \times 10^3$ lbs/in$^2$, Compressive Strength of $40 \times 10^3$ lbs/in$^2$, Transverse Tensile Strength of $4 \times 10^3$ lbs/in$^2$, Interlaminar Shear Strength of $7 \times 10^3$ lbs/in$^2$, a Poisson's Ratio of 0.34, a Modulus of $11 \times 10^6$ lbs/in$^2$ and a Shear Modulus of $0.3 \times 10^6$ lbs/in$^2$.

A suitable aromatic polyamid fibre is sold under the trademark KEVLAR by the DuPont Company.

The braided, aromatic polyamid tows 44, like the carbon fibre tows 40, are impregnated or encapsulated in a "B" stage thermoset epoxy resin matrix discussed hereinbefore. The sheath 42 envelopes the carbon fibre tows 40 and precludes splaying of any fibres incident to formation of the head 12 or deformation of the blind head forming portion 16 as well as controlling the shape thereof.

Figure 3:
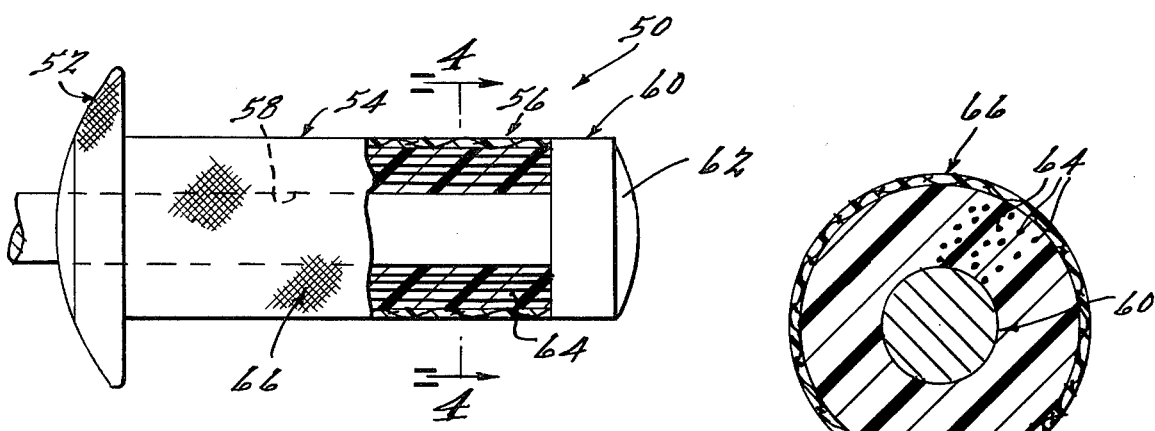
FIG. 3 is a view similar to FIG. 1 of another embodiment of the instant invention utilizing parallel carbon fibres.
Figure 4:
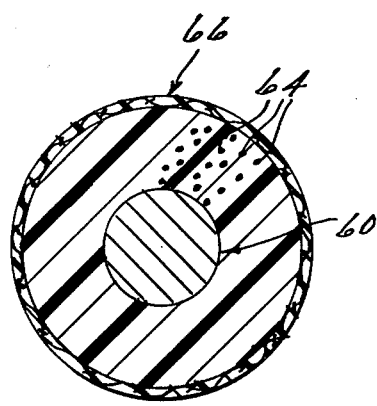
FIG. 4 is a view taken along the line 4—4 of FIG. 3.

Referring to FIG. 3 of the drawings, a second embodiment of the invention comprises a rivet 50 having a head portion 52, shear portion 54 and head forming portion 56. The head, shear, and head forming portions 52, 54, and 56 have a central aperture 58 therein for the acceptance of a mandrel 60. The mandrel 60, like the mandrel 18, has an anvil 62 thereon to effect compression of the "B" stage thermoset resin head forming portion 56. The dimensions of the blind rivet 50 are similar to those of the rivet 10, the distinction being that a plurality of carbon fibre tows 64 are disposed about the mandrel 60 in parallel relationship to one another as opposed to a braided array. Parallel orientation of the carbon fibres maximizes the number of fibres that can be packed into the cylindrical configuration of the rivet 50. The carbon fibre tows 64 are encapsulated in a "B" stage thermoset resin matrix similar to the fibres 40 and are enveloped by a woven aromatic polyamid sheath 66 similar to the sheath 42.

It is desirable that, as illustrated in FIG. 5, the carbon fibres 64 within the head forming portion 56 of the rivet 50 tend to remain in a generally "laminar" array incident to the application of heat to the head forming portion 56, "setting" of the rivet 50 due to tensioning of the mandrel 60, and subsequent complete polymerization of the resin matrix.

As seen in FIG. 6 of the drawings, yet another constructed embodiment of the instant invention comprises a rivet 70 having head forming portions 72 and 74 at opposite ends of a shear portion 76. The shear portion 76 of the rivet 70 is coextensive with the cumulative thickness of juxtaposed workpieces 78 and 80.

The rivet 70 comprises a plurality of parallel tows 82 of carbon fibre impregnated in an epoxy thermoset resin that is blended with an aromatic amine curing agent and partially polymerized as discussed hereinbefore. The carbon fibre tows 82 are enveloped by an outer sheath 84 comprising braided tows 86 of aromatic polyamid fibres that, like the carbon fibres 82, are impregnated in a "B" thermoset epoxy resin matrix. The sheath 84 envelopes the carbon fibre tows 82 and precludes splaying thereof incident to deformation of the head forming portions 72 and 74 as well as aiding in shape control thereof.

As seen in FIG. 7, a pair of heading tools 88 and 90 are brought to bear against the heated head forming portions 72 and 74 which results in displacement and reformation thereof to the configuration shown. The bias of the tools 88 and 90 on the rivet 70 is preferably maintained for a length of time necessary to effect complete polymerization of the "B" stage head forming portions 72 and 74 which results in and maintains "draw up" of the workpieces 78 and 80. The carbon fibre tows 82 within the head forming portions 72 and 74 of the rivet 70 tend to be maintained in a generally "laminar" array upon the application of heat thereto and "setting" of the rivet 70 in the manner discussed hereinbefore.

As seen in FIG. 8 of the drawings, yet another constructed embodiment of the instant invention comprises a rivet 100 having had forming portions 102 and 104 at opposite ends of a shear portion 106. A mandrel 108 having a head forming anvil 110 extends through a central aperture 112 in the head forming portions 102 and 104 and shear portion 106. The shear portion 106 of the rivet 110 is coextensive with the cumulative thickness of juxtaposed workpieces 114 and 116.

The rivet 100 comprises a plurality of parallel tows 118 of carbon fibre impregnated in an epoxy thermoset resin that is blended with an aromatic amine curing agent and partially polymerized as discussed hereinbefore. The carbon fibre tows 118 are enveloped by an outer sheath 120 comprising braided tows 122 of aromatic polyamid fibre that, like the carbon fibres 118, are impregnated in a "B" stage thermoset epoxy resin matrix. The sheath 120 envelopes the carbon fibre tows 118 and precludes splaying thereof incident to deformation of the head forming portions 102 and 104 as well as aiding in shape control thereof.

As seen in FIG. 9, a heading tool 122 is brought to bear against the heated head forming portion 102 and the mandrel 108 is terminated which results in displacement and reformation of the head forming portions 102 and 104 to the configuration shown. The bias of the tool 122 on the head 102 and mandrel 108 is preferably maintained for a length of time necessary to effect complete polymerization of the "B" stage head forming portions 102 and 104 which results in and maintains "draw up" of the workpieces 114 and 116.

It is to be noted that the application of heat to initiate softening and full polymerization of the head forming portions of the rivets 10, 50, 70 and 100 discussed above is a relative matter. For example, shelf life of the unset rivets 10, 50, 70 or 100 can be extended or a temperature differential achieved relative to ambient temperature necessary to effect softening of the head forming portions, by freezing the partially polymerized rivets. Moreover, the amount and duration of heat applied is a function of the particular "B" stage thermoset epoxy resin utilized. In a constructed embodiment, a rivet was maintained at a storage or "shelf" temperature of 0° Farenheit. Thereafter the rivet was elevated to a temperature of 180° F. by the application of heat to the rivet at which temperature softening of the head forming portion was evidenced. Subsequently, the temperature was raised to approximately 400° F. to facilitate formation of the rivet head and to complete polymerization.

From the foregoing description it should be apparent that the rivet of the instant invention exhibits strength characteristics similar to known composite materials. The rivet is relatively easily set within a complementary aperture in the workpiece. Softening and subsequent full polymerization of the "B" stage head forming thermoset resin matrix is achieved by the application of heat that is relatively higher than the design storage temperature of the rivet. Mushrooming of the head forming portion or portions of the rivet is controlled by the high tensile strength, low modulus sheath to insure consistency of head shape and to preclude splaying of the carbon fibres from the rivet.

While preferred embodiments of the invention have been disclosed, it should be appreciated that the invention is susceptible of modification without departing from the scope of the following claims.

I claim:
1. A reinforced thermoset plastic rivet comprising:
   a plurality of substantially parallel continuous longitudinally extending carbon fibres encapsulated in a B-stage thermoset resin matrix,
   a plurality of longitudinally and circumferentially extending aromatic polyamid fibres enveloping said carbon fibres and encapsulated in a B-stage thermoset resin matrix,
at least one portion of said rivet being deformable to form a rivet head and fully polymerizable to the thermoset condition upon heating thereof, said polyamid fibres enveloping said carbon fibres after formation of said rivet head to preclude splaying of said carbon fibres.

2. A rivet in accordance with claim 1 including: a mandrel extending centrally thereof and having a head forming portion movable axially relative to said carbon and polyamid fibres to effect lateral displacement thereof to form a head on said rivet.

* * * * *